United States Patent [19]

Blemberg

[11] Patent Number: 5,102,323
[45] Date of Patent: Apr. 7, 1992

[54] PLASTIC RESIN MULTI-LAYER CO-EXTRUSION EXTRUDER WITH MULTI-PORT PLUG FOR SELECTING ORDER OF LAYERS

[75] Inventor: Robert J. Blemberg, Appleton, Wis.

[73] Assignee: American National Can Company

[21] Appl. No.: 551,585

[22] Filed: Jul. 11, 1990

Related U.S. Application Data

[63] Continuation of Ser. No. 239,129, Aug. 31, 1988, abandoned.

[51] Int. Cl.⁵ ............... B29C 47/06; B29C 47/70
[52] U.S. Cl. ............... 425/133.5; 264/176.1;
  264/349; 425/131.1; 425/190; 425/382.3;
  425/463; 425/215
[58] Field of Search ............... 264/349, 176.1, 37;
  425/133.1, 133.5, 131.1, 132, 376.1, 381, 190,
  382.3, 464, 463, 215, 217

[56] References Cited

U.S. PATENT DOCUMENTS

| | | | |
|---|---|---|---|
| 2,993,230 | 7/1961 | Henry | 264/176.1 |
| 3,093,861 | 6/1963 | Rex | 264/349 |
| 3,389,434 | 6/1968 | Cleereman et al. | 425/381 |
| 3,743,460 | 7/1973 | Woolridge | 425/133.5 |
| 4,094,947 | 6/1978 | Alfrey, Jr. et al. | 425/133.5 |
| 4,316,710 | 2/1982 | Greenwood | 425/131.1 |
| 4,336,213 | 6/1982 | Fox | 425/382.3 |
| 4,403,934 | 9/1983 | Rasmussen et al. | 425/133.1 |
| 4,761,129 | 8/1988 | Aste et al. | 425/462 |
| 4,784,815 | 11/1988 | Cloeren et al. | 425/131.1 |
| 4,832,960 | 5/1989 | Compagnon | 425/131.1 |

FOREIGN PATENT DOCUMENTS

| | | | |
|---|---|---|---|
| 234522 | 9/1987 | European Pat. Off. | 425/131.1 |
| 255043 | 2/1988 | European Pat. Off. | 425/464 |
| 87-05258 | 9/1987 | PCT Int'l Appl. | 425/131.1 |

Primary Examiner—Jeffery Thurlow
Assistant Examiner—Mathieu Vargot
Attorney, Agent, or Firm—Robert A. Stenzel

[57] ABSTRACT

A plastic resin extruder to co-extrude a multi-layer melt-laminate film including a multi-port diverter plug which selects the orders of the layers by changing the alignment of the plug channels with different pairs of exit and entrance ports. The walls of the plug and its barrel are tapered and the plug is rotatable about its axis. The plug has interconnected indentations which lie between its surface channels with the indentations leading to a weep hole. Resin which leaks from the channels to the indentations is led out the weep hole so that leakage of resin from one surface to another is prevented.

15 Claims, 2 Drawing Sheets

5,102,323

PLASTIC RESIN MULTI-LAYER CO-EXTRUSION EXTRUDER WITH MULTI-PORT PLUG FOR SELECTING ORDER OF LAYERS

This application is a continuation of application Ser. No. 07/239,129, filed Aug. 31, 1988, now abandoned.

BACKGROUND OF THE INVENTION

The present invention relates to an extruder apparatus for the extrusion of multi-layers of plastic resin and more particularly to an improvement in a multi-port selector plug for the feedblock portion of such apparatus.

At the present time, it is known that a number of layers of plastic resin may be formed into a flat or tubular film by co-extrusion. The various plastic resin layers may be of different thermoplastic resins and the layers may be different thicknesses. Each of the plastic resins, generally in the form of pellets, is individually melted and forced by pressure through the extruder apparatus and out of the orifice of its multi-manifold extrusion die to form a multi-layer laminate. The term "melt-lamination" is sometimes used to describe this process, and the lamination may be formed with, or without layers of adhesive, depending on the thermoplastic resins used in the lamination.

The die generally forms the multi-layer laminate into a flat sheet, a flat film or a tubular film. The multi-layer laminate is advantageous compared to a single layer of a uniform material, because each plastic resin layer of the laminate may be selected for its best property, such as a layer which is a barrier to oxygen, thereby forming a combination of layers having a combination of properties. In "co-extrusion" or "melt-lanination" the molten resins are formed into layers, within the extruder, and joined under pressure within the die to emerge as a single laminated material. The molten layers, within the feedblock and die, under proper flow conditions, exhibit laminar flow in which the molten layers are joined without intermixing.

A "multi-manifold" die system has an individual flow channel ("manifold") for each layer. Generally the laminar flow layers are brought together just above the exit orifice of the die. Each manifold may be provided with an adjustable flow restricter so that the uniformity of the layer's thickness may be adjusted.

It is also known that the relative order of the layers may be changed using a multi-port valve device, called a "Cloeren diverter plug" or "selector plug", without repiping the extruder, see "Coextrusion takes a giant step into the future", *Modern Plastics*, August 1983. The multi-port valve device consists of a plug in a barrel, the plug generally having surface channels and two or more channels crosswise to its axis. The plug may be rotated, for example by one-half turn, to line up each of its channels with one pair of exit and entrance ports. The plug may again be rotated to re-align its channels with different pairs of ports. The plug directs the molten plastic resins so that they flow in a selected order. For example, if the plastic resin layers of a co-extruded film are in the order A, B, C with B as an internal layer between outer layers A and C, the plug may be rotated so that the order becomes A, C, B with C becoming the inner layer.

However, the co-extrusion diverter plug presents a number of problems. First, leakage may occur between the layers, which results in defects in appearance. Secondly, the plug divider may become worn so that its channels do not exactly align with the various pairs of ports. This in a possible further cause of leakage and results in appearance defects in the finished film.

OBJECTIVES AND FEATURES OF THE INVENTION

An object of the present invention is to provide an improved diverter plug to change the flow of molten plastic within the feedblock in order to change the relative order of the layers in a heat-laminated co-extruded film, while the improved diverter plug will not leak and will thereby avoid appearance defects in the film arising from intermixing of the layers at the diverter plug.

A further objective of the present invention is to provide a diverter plug which will be relatively long-wearing and which will provide non-leaking flow paths even after prolonged usage.

A further objective of the present invention is to enable the diverter plug assembly to be assembled and disassembled quickly and easily from within the barrel of the feedback.

A still further objective of the present invention is to provide such a diverter plug which may be accurately machined at a cost not appreciably greater than alternative diverter plugs.

A feature of the present invention is to provide a plastic resin extruder apparatus to form a multi-layer film. The extruder includes melt means to separately melt a plurality of different plastic resins and apply pressure to the separate molten resins. A die head means maintains the molten resins in separate flows and joins them in a selected order to extrude the film.

The extruder includes a multi-port plug assembly including a barrel having an entry port for each of the resins in flow communication with the melt means and an exit port for each of the resins in flow communication with the die head means. A rotatable plug having an imaginary axis fits within the barrel and has a plurality of channels therein. Each of the channels is alignable with different pairs of the entry and exit ports, enabling the order of the layers to be changed by rotation of the plug about its axis and within the barrel. The barrel is tapered and the plug is also tapered, thereby helping to prevent leakage of the molten resin from one channel to the other in the plug assembly.

As an added insurance against undesirable interlayer mixing, a further feature of the present invention is that the plug has resin guidance surface channels on its surface and leakage guidance indentions on its plug surface which are shallow compared to the surface channels. The indentations lie between the resin guidance channels. A weep hole channel is the extruder has an orifice positioned proximate to an indentaion. The indentations communicate to the said weep hole orifice so that any resin which leaks from the surface channels is guided by the indentations to the weep hole channel.

BRIEF DESCRIPTION OF THE DRAWINGS

Other objectives and features of the present inventions will be apparent from the folowing detailed description taken in conjunction with the accompanying drawings. In the drawings.

DETAILED DESCRIPTION OF THE INVENTION

Figure 1:
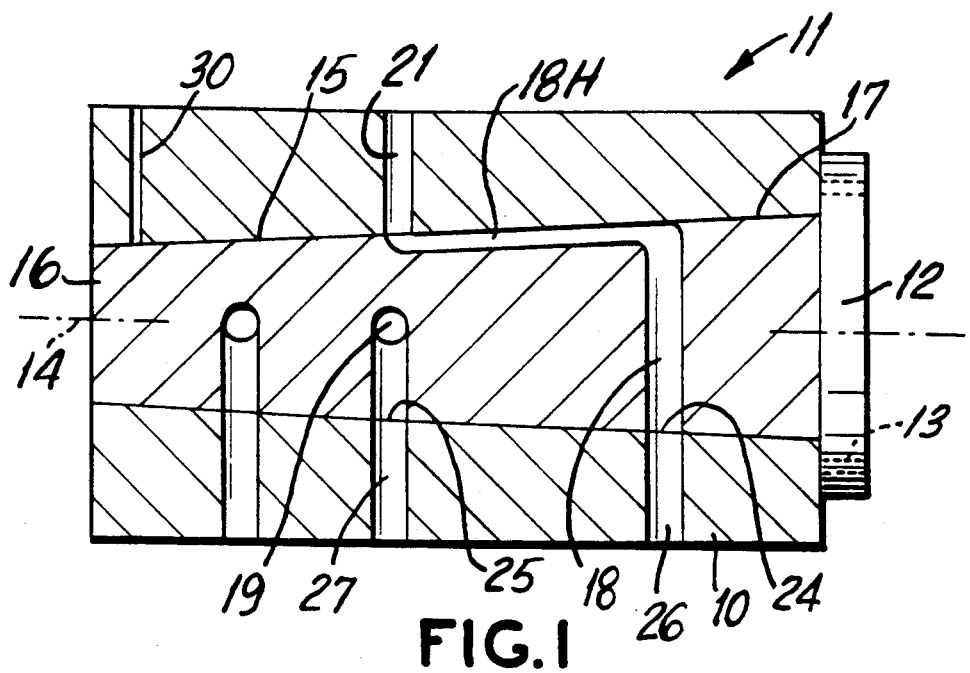
FIG. 1 is a cross-sectional view of a simplified diverter plug of the present invention, the view being taken through its axis.

As shown in FIG. 1, the multi-port plug assembly of the present invention is part of the feedblock head 10 of a heat-lamination multi-layer plastic resin extruder.

The plug 11 comprises an outer head portion 12 which is bolted to head 10 by bolts 13. The plug 11 has an imaginary axis 14 and is round in cross-section (taken in sections perpendicular to axis 14). The outer face 15 of the plug is tapered so that its interior wall 16 is smaller in outer diameter than the outer diameter at its exterior end 17.

The plug has at least two internal channels (bores) 18, 19. The channel 18 has horizontal branch 18H which communicates with entry port 20 in the head. The port 20 is the orifice of channel 21 which leads to a first source of one melted plastic resin. The exit ports 24, 25 lead to exit channels 26, 27, respectively, which conduct the melted plastic resin to be joined within the die head. The taper is in the range of 0.5 to 10 degrees relative to the axis 14, and preferably is 1 to 5 degrees.

Figure 3:
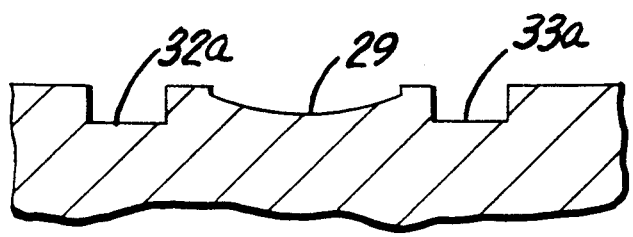
FIG. 3 is an enlarged cross-sectional view of a small portion of the diverter plug of FIG. 2, the view being taken through its axis.
Figure 4:
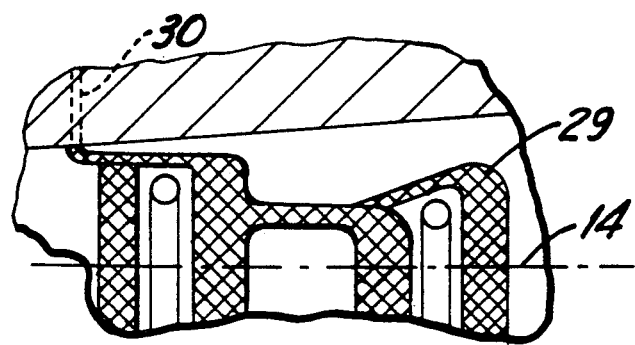
FIG. 4 is a side plan view of a small portion of the diverter plug of FIG. 2 with the barrel being shown in cross-section.

In addition, to prevent any leakage which may occur from flowing from one resin material to another, the plug is provided with a series of guide indentations 29, on its exterior wall, which lead to a small relief weep hole channel 30 see FIGS. 3 and 4. Any material which would leak from one surface depression to another is caught in the indentations 29 and lead, as waste material, out through the weep hole channel 30.

Figure 2:
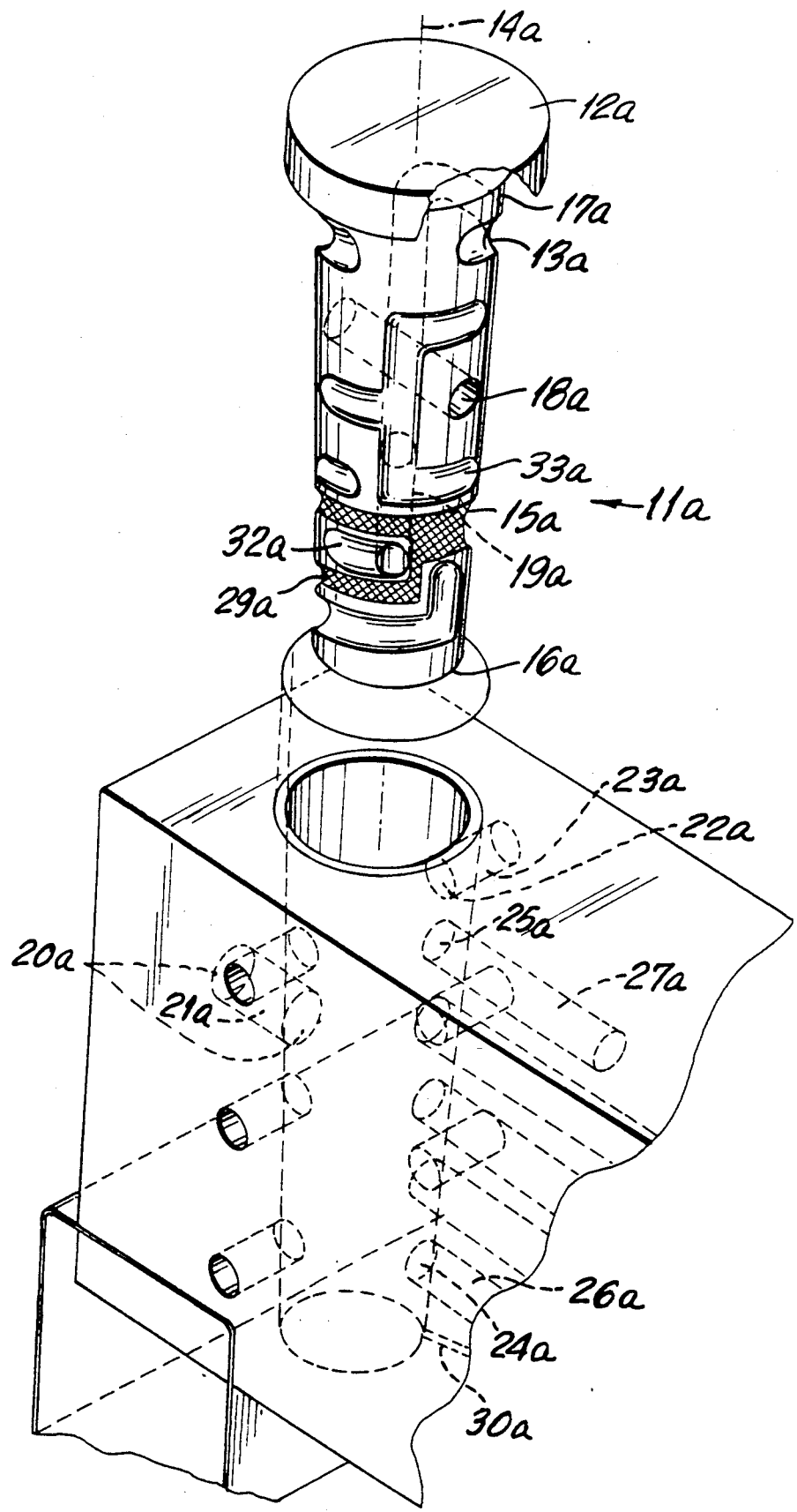
FIG. 2 is a perspective view of the diverter plug of the present invention.

As shown in FIG. 2, the parts of the multi-plug assembly correspond to the parts of the plug of FIG. 1, except the corresponding parts are labeled with an "a". The plug 11a is part of the extruder head 10a of a five-layer heat lamination plastic resin extruder.

The plug 11a has an outer head portion 12a, an imaginary axis 14a and is round in cross-section. The outer face 15a of the plug is tapered. The plug has at least two internal channels (bores 18a, 19a and exterior depressions 31a, 32a and 33a) to guide the liquid resin.

The depressions 31a, 32a, 33a ("resin guidance surface channels") conduct the main floor of liquid resin while leakage is removed through indentations 29, 29a ("linkage guidance indentations"), see FIGS. 3 and 4.

The channel 18a communicates with entry port 20a, the orifice of channel 21a, leading to a first source of one melted plastic resin. The port 22a is the orifice of channel 23a leading to a source of a different melted plastic resin. The exit ports 24a, 25a lead to exit channels 26a, 27a, respectively, which conduct the melted plastic resin to be joined within the die head. The taper, as in FIG. 1, is in the range of 0.5 to 10 degrees. The guide indentations 29a, on the exterior wall of the plug, lead to a small relief weep hole channel 30a.

For the purpose of clarity of illustration, the indentation 29a is shown on only the lower part of the plugs, although preferably such indentations are positioned between each surface channel and port and all the indentations lead to the weep hole channel 30a. Then diverter plug preferably has at least three connected leakage guidance indentations.

As an example, the depth of the surface channel, such as 32a, 33a, is preferably 0.5" and its width is 0.625"; and the depth of an indentation, such as indentation 29a, is 0.125" and its width is 0.250".

Preferably the diverter plug is sealed by one or more "O" ring seals (not shown) which are positioned along the taper surface between the plug's outer wall and the barrel.

The taper fit of the diverter plug in the tapered barrel of the feedblock permits its easy assembly and disassembly.

Although the drawings and description show a diverter plug having both a taper fit and shallow guide indentations between channels, it will be understood that the plug may be formed only with the taper fit. The shallow guide indentations are only an insurance against interlayer mixing. That insurance may not be needed if the taper fit is sufficiently exact to effectively prevent interlayer mixing.

What is claimed is:

1. A plastic resin extruder apparatus to form a multilayer film including:

melt and pressure means to separately melt a plurality of separate plastic resins and apply pressure to the separate molten resins, a die head means to maintain the molten resins in separate flows, join them in a selected order and extrude them as a multilayer film, a multiport assembly including a barrel having a plurality of entry ports with each entry port being for one of said resins and each entry port being in flow communication with said melt means, a plurality of exit ports with each exit port being for one of said resins and each exit port being in flow communication with said die head means, and a rotatable plug having an axis, fitting within said barrel and having a plurality of channels therein, each of said channels being selectively alignable with different pairs of said entry and exit ports to change the order of said layers by rotation of said plug about its axis within said barrel, the improvement comprising: that the barrel is tapered and the plug is tapered to fit tightly in said barrel to prevent leakage of the molten resin from one channel to another channel of the plug assembly; that the plug has resin guidance surface channels on the exterior surface of the plug; that the exterior surface of the plug includes at least one leakage guidance indentation positioned between said resin surface channels, said guidance indentation being shallow in depth in comparison to the depth of said surface channels; and, that there is a weep hole channel is said extruder having a weep hole orifice positioned proximate to said indentation, wherein said guidance indentation contacts said weep hole orifice to guide resin which leaks from said surface channels to said weep hole channel.

2. An extruder apparatus as in claim 1 having at least five separated flows of resins therein and at least two surface channels and at least three connected leakage guidance indentations.

3. A plastic resin extruder apparatus to form at least five separate plastic resins and apply pressure to the separate molten resins:

a die head means to maintain said molten resins in separate flows, join them in a selected order and extrude them as a multilayer film;

a multiport plug assembly including a barrel having a plurality of at least five entry ports with each entry port being for one of said resins and each entry port being in flow communication with said melt means, a plurality of at least five exit ports with each exit port being for one of said resins and each exit port being in flow communication with said die head means, and a rotatable plug having an axis, fitting within said barrel and having a plurality of at least five channels therein, each of said channels being selectively alignable with different pairs of said entry and exit ports to change the order of said layers by rotation of said plug about its axis within said barrel, wherein portions of at least two of said channels are resin guidance surface channels having a depth on the surface of the plug, the improvement comprising: that the barrel is tapered and the plug is tapered to fit tightly in said barrel to prevent leakage of the molten resin from one channel to another channel of the plug assembly; that the plug has resin guidance surface channels on the exterior surface of the plug; that the exterior surface of the plug includes at least one leakage guidance indentation positioned between said resin surface channels, said guidance indentation being shallow in depth in comparison to the depth of said surface channels; and, that there is a weep hole channel in said extruder having a weep hole orifice positioned proximate to said indentation, wherein said guidance indentation contacts said weep hole orifice to guide resin which leaks from said surface channels to said weep hole channel.

4. The extruder apparatus of claim 1 wherein relative to the axis the taper is in the range of 0.5 to 10 degrees.

5. The extruder apparatus of claim 2 wherein relative to the axis the taper is in the range of 0.5 to 10 degrees.

6. The extruder apparatus of claim 3 wherein relative to the axis the taper is in the range of 0.5 to 10 degrees.

7. The extruder apparatus of calim 4 wherein relative to the axis the taper is in the range of 1 to 5 degrees.

8. The extruder apparatus of claim 5 wherein relative to the axis the taper is in the range of 1 to 5 degrees.

9. The extruder apparatus of claim 6 wherein relative to the axis the taper is in the range of 1 to 5 degrees.

10. The extruder apparatus of claim 7 wherein the depth of the surface channels is about 0.5", the width of the surface channels is about 0.625", the depth of the guidance indentation is about 0.125" and the width of the guidance indentation is about 0.250".

11. The extruder apparatus of claim 2 wherein the depth of the surface channels is about 0.5", the width of the surface channels is about 0.625", the depth of the guidance indentation is about 0.125" and the width of the guidance indentation is about 0.250".

12. The extruder apparatus of claim 3 wherein the depth of the surface channels is about 0.5", the width of the surface channels is about 0.625", the depth of the guidance indentation is about 0.125" and the width of the guidance indentation is about 0.250".

13. The extruder apparatus of claim 7 wherein the depth of the surface channels is about 0.5", the width of the surface channels is about 0.625", the depth of the guidance indentation is about 0.125" and the width of the guidance indentation is about 0.250".

14. The extruder apparatus of claim 8 wherein the depth of the surface channels is about 0.5", the width of the surface channels is about 0.625", the depth of the guidance indentation is about 0.125", and the width of the guidance indentation is about 0.250".

15. The extruder apparatus of claim 9 wherein the depth of the surface channels is about 0.54", the width of the surface channels is about 0.625", the depth of one guidance indentation is about 0.125", and the width of the guidance indentation is about 0.250".

* * * * *